(12) United States Patent
Lin

(10) Patent No.: US 7,065,151 B2
(45) Date of Patent: Jun. 20, 2006

(54) CHANNEL OPTIMIZATION SYSTEM

(75) Inventor: Jingdong Lin, Irvine, CA (US)

(73) Assignee: Agere Systems Inc., Allentown, PA (US)

( * ) Notice: Subject to any disclaimer, the term of this patent is extended or adjusted under 35 U.S.C. 154(b) by 798 days.

(21) Appl. No.: 09/746,352

(22) Filed: Dec. 21, 2000

(65) Prior Publication Data

US 2002/0118772 A1    Aug. 29, 2002

(51) Int. Cl.
*H04B 15/00* (2006.01)
*H04K 1/02* (2006.01)
*H04L 25/03* (2006.01)

(52) U.S. Cl. .................... 375/285; 375/278; 375/284; 375/296; 375/349

(58) Field of Classification Search ............... 375/285, 375/223, 341, 260, 222, 284, 286, 267, 240, 375/219, 295, 261, 349, 296, 278; 370/336, 370/376, 477, 207, 468, 330; 713/176
See application file for complete search history.

(56) References Cited

U.S. PATENT DOCUMENTS

| | | | | |
|---|---|---|---|---|
| 5,878,077 A | * | 3/1999 | Betts | 375/222 |
| 6,084,917 A | * | 7/2000 | Kao et al. | 375/260 |
| 6,269,129 B1 | * | 7/2001 | Rhee et al. | 375/341 |
| 6,424,678 B1 | * | 7/2002 | Doberstein et al. | 375/260 |
| 6,535,497 B1 | * | 3/2003 | Raith | 370/336 |
| 6,549,584 B1 | * | 4/2003 | Gatherer et al. | 375/261 |
| 6,553,063 B1 | * | 4/2003 | Lin et al. | 375/223 |
| 2002/0097791 A1 | * | 7/2002 | Hansen | 375/222 |

\* cited by examiner

*Primary Examiner*—Stephen Chin
*Assistant Examiner*—Ted M. Wang

(57) ABSTRACT

A channel optimization system for use with a communications channel and method of separating and encoding signals associated with the communications channel. In one embodiment, the channel optimization system includes an assorter that receives first and second signals having disparate transmission characteristics and selects one of the first and second signals. The channel optimization system also includes a translator, coupled to the assorter, that encodes the selected one of the first and second signals into a symbol representation as a function of a transmission characteristic associated therewith.

39 Claims, 5 Drawing Sheets

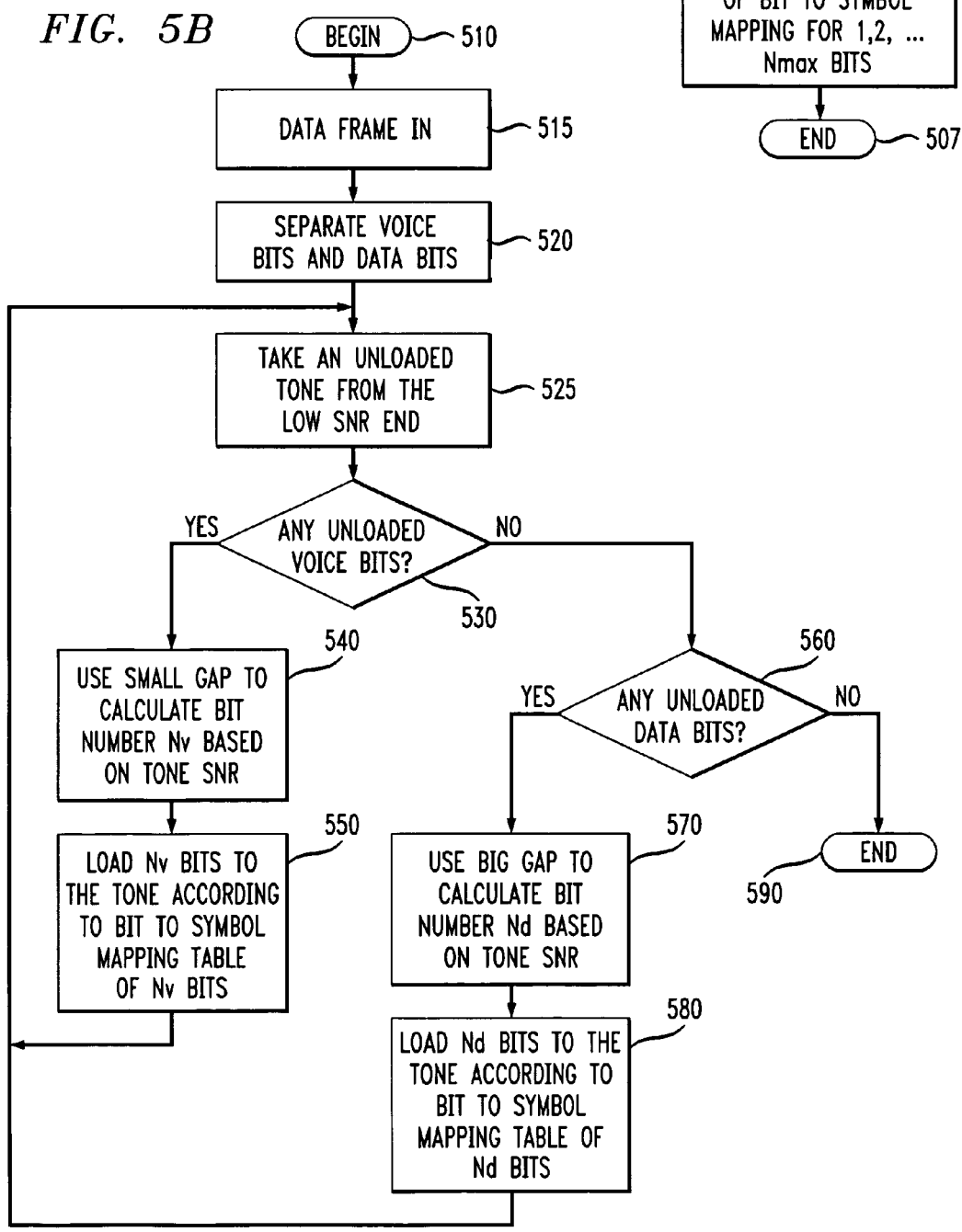

CHANNEL OPTIMIZATION SYSTEM

TECHNICAL FIELD OF THE INVENTION

The present invention is directed, in general, to signal processing and, more specifically, to a channel optimization system and method of separating and encoding signals associated with a communications channel of a telecommunications network.

BACKGROUND OF THE INVENTION

With the development of broadband telecommunication systems, the use of data channels to carry voice signals is becoming widespread. The voice signals may be transmitted over a variety of medium and employing different protocols. For instance, the transfer of voice signals has become increasingly ubiquitous, employing a vast array of technologies such as Digital Subscriber Line Service and over a vast array of networks such as Internet Protocol based packet networks. Moreover, there is every reason to believe that this trend will continue.

One measurement of an efficiency associated with a signal traversing a communications channel of a telecommunications network is the bit error rate (BER). The BER may be defined as the percentage of received bits having errors relative to the total number of bits received during a transmission. Generally speaking, the BER associated with the transmission of voice signals is about $10^{-3}$ and of non-voice data signals about $10^{-7}$. Thus, data signals are typically more sensitive to errors than voice signals. Although voice and data signals have different BER tolerances and sensitivity levels, voice and data signals have been processed in the same manner in telecommunication systems of the past, at least insofar as the requirements associated with the BER are concerned. While the telecommunications systems presently employed are less complex to implement, requiring voice signals and data signals to abide by equivalent transport techniques (even though the requirements may be different) is not the most efficient use of the bandwidth of a telecommunications network.

In conjunction with the transfer of information across the telecommunications network, telecommunications systems often employ modulation techniques to more efficiently transfer the information across a communications channel of the network. For instance, quadrature amplitude modulation (QAM) is one modulation technique that carries the information bits in both the in-phase and quadrature direction and shifts the signal band around a single carrier frequency. In a modulation technique such as QAM, the unit of information transferred is called a "symbol", which may in turn represent multiple bits of information. The number of bits represented by a symbol is referred to as its "symbol density."

A theoretical channel capacity of a communications channel associated with a telecommunications network can be derived by the well recognized Shannon's formula. While Shannon's theorem describes the theoretical capacity of a communications channel, for a given modulation technique there is a disparity between the attainable channel capacity and the theoretical capacity. The difference between the theoretical and attainable channel capacity is represented by the signal-to-noise ratio (SNR) gap and it determines how many bits can be loaded to a symbol for a particular modulation technique such as QAM.

Additionally, for reasons that will become more apparent, the SNR gap is related to the BER associated with the information traversing the communications channel and, as mentioned above, has a bearing on the maximum symbol constellation density allowable. In a situation where the SNR gap is quite large, each transmitted symbol conveys less information to accommodate the larger gap. (i.e., the attainable channel capacity is further removed from the theoretical channel capacity.) Thus, it is important to pack as much information as possible into a symbol (or for that matter any representation of information traversing a communications channel) to more effectively maximize the bandwidth of the telecommunications network.

Accordingly, what is needed in the art is a system and method that more efficiently manages the transmission of information (e.g., voice and data signals) across a telecommunications network that overcomes the deficiencies in the prior art.

SUMMARY OF THE INVENTION

To address the above-discussed deficiencies of the prior art, the present invention provides a channel optimization system for use with a communications channel and method of separating and encoding signals associated with the communications channel. In one embodiment, the channel optimization system includes an assorter that receives first and second signals having disparate transmission characteristics and selects one of the first and second signals. The channel optimization system also includes a translator, coupled to the assorter, that encodes the selected one of the first and second signals into a symbol representation as a function of a transmission characteristic associated therewith.

The present invention introduces, in one aspect, a channel optimization system that processes multiple signals traversing a communications channel of a telecommunications network in a different manner. In conjunction therewith, the assorter of the channel optimization system separates the signals by, for instance, the bit error rate (BER) transmission characteristics of the signals. The translator of the channel optimization system then encodes the signals for insertion on to the communications channel. As a result, the channel optimization system more efficiently utilizes the available bandwidth of the communications channel of the telecommunications network.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 5A illustrates a flow diagram of an embodiment of an initialization of a channel optimization system in accordance with the principles of the present invention.

FIG. 5B illustrates a flow diagram of an embodiment of an operation of a channel optimization system in accordance with the principles of the present invention.

DETAILED DESCRIPTION

Figure 1:
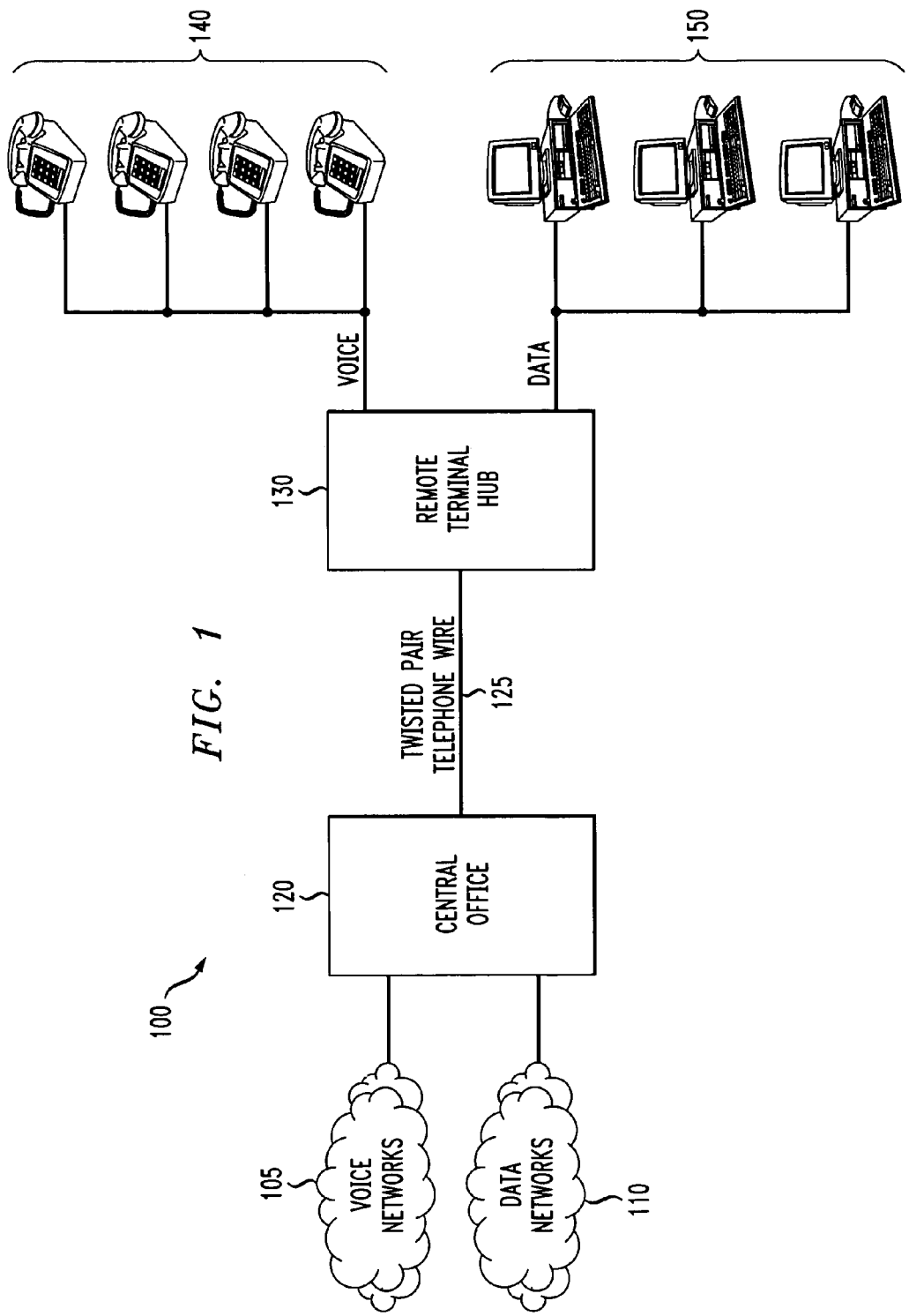
FIG. 1 illustrates a system level diagram of an embodiment of a telecommunications network providing an environment for the application of the principles of the present invention.

Referring initially to FIG. 1, illustrated is a system level diagram of an embodiment of a telecommunications network 100 providing an environment for the application of the principles of the present invention. The telecommunications network 100 includes voice and data networks 105, 110 coupled to a central office 120. The central office 120 is then coupled via a twisted pair wire 125 which may carry a Digital Subscriber Line (DSL) service to a remote terminal hub 130. The remote terminal hub 130 then splits the voice and data signals for delivery to the voice terminals 140, either plain old telephone stations (POTs) or derived voice service terminals, and computer terminals 150, respectively. Of course, the telecommunications network 100 is only one example of a network that may benefit from the principles of the present invention. Those skilled in the art, therefore, should understand that other network configurations are well within the broad scope of the present invention.

For presentation purposes, the voice network 105 transmits the voice signals and the data network 110 transmits the data signals. The voice and data signals have different transmission characteristics and requirements associated therewith. In the central office 120, after a certain level of call processing has occurred, the voice and data signals are then processed to derive and apply an appropriate symbol representation in a manner described with respect to the following FIGUREs. The voice and data signals are then transmitted from the central office 120 over the twisted pair wire 125 to the remote terminal hub 130.

As stated above, the remote terminal hub 130 receives the voice and data signals from the twisted pair wire 125 and performs a variety of signal processing tasks, possibly analogous to the signal processing tasks performed in the central office 120. The remote terminal hub 130 then sends the voice signals to the voice terminals 140 and the data signals to the computer terminals 150.

A channel capacity (C) of the twisted pair wire 125 or any subchannel thereof, or for that matter of any other given transmission medium, has a theoretical rate of error-free extractable bits-per-second signal throughput. The theoretical throughput is a function of the given channel's or subchannel's signal-to-noise ratio (SNR), as given by Shannon's theorem:

$$C = \log_2(1 + SNR).$$

As previously mentioned, however, for any given telecommunications system employing a modulation technique, there is a disparity between the theoretical channel capacity and the attainable channel capacity. The channel capacity is affected by factors such as the modulation technique employed and the bit error rate (BER) associated with the information traversing the communications channel. For example, in quadrature amplitude modulation (QAM), the channel capacity is:

$$C = \log_2(1 + 3/\Delta^2 \times SNR).$$

The inverse of the additional term "$\Delta^2/3$" is called the "SNR gap," or more simply, just the "gap". The term "$\Delta^2$" is related to the BER desired error rate. As can be deduced from the above equation, as the desired BER (expressed in terms of an increasing value for $\Delta$, as to be detailed below) becomes more rigorous, the product of the inverse of the SNR gap and the SNR of the transmission medium decreases, and hence the channel capacity decreases. The channel capacity may be interpreted as the throughput of a telecommunications network taking into account the SNR gap, which is in turn depends on the BER of the transmitted information.

As previously mentioned, the SNR gap is a function of the required BER, represented as "p", of the information traversing the communications channel. The relationship can be expressed in a formula as set forth below:

$$p = \frac{2}{\sqrt{2\pi}} \int_\Delta^\infty e^{\frac{x^2}{2}} dx.$$

For exemplary BER values, the corresponding values of $\Delta$ and the SNR gap are illustrated in table as set forth below:

TABLE 1

| BER | $10^{-2}$ | $10^{-3}$ | $10^{-4}$ | $10^{-5}$ | $10^{-6}$ | $10^{-7}$ |
|---|---|---|---|---|---|---|
| $\Delta$ | 2.577 | 3.287 | 3.891 | 4.418 | 4.892 | 5.333 |
| Gap (dB) | 3.45 | 5.56 | 7.03 | 8.13 | 9.02 | 9.77 |

Both the SNR and the SNR gap will also determine how many bits can be loaded to a symbol for any modulation technique employed (e.g., QAM or of any other modulation technique). For example, in a QAM system, the maximum number of bits that can be loaded to a QAM symbol is usually calculated as follows:

$$b = \log_2\left(1 + 10^{\frac{G}{10}}\right)$$

where, $$G = SNR - SNR \text{ gap} - \text{margin} + \text{CodingGain}.$$

The "margin" is included to provide a margin of error to compensate for, among other things, unexpected or signal degradation phenomena. The "CodingGain" generally represents the equivalent gain of the SNR in decibels (dBs) based upon certain well known error control algorithms.

As demonstrated by the foregoing formulas, more bits can be loaded per symbol if the SNR gap (which is in turn a function of the BER of the information traversing the communications channel) is smaller. More bits loaded per symbol can lead to a more efficient telecommunications network providing a motivation for the discovery of the principles of the present invention.

Figure 2:
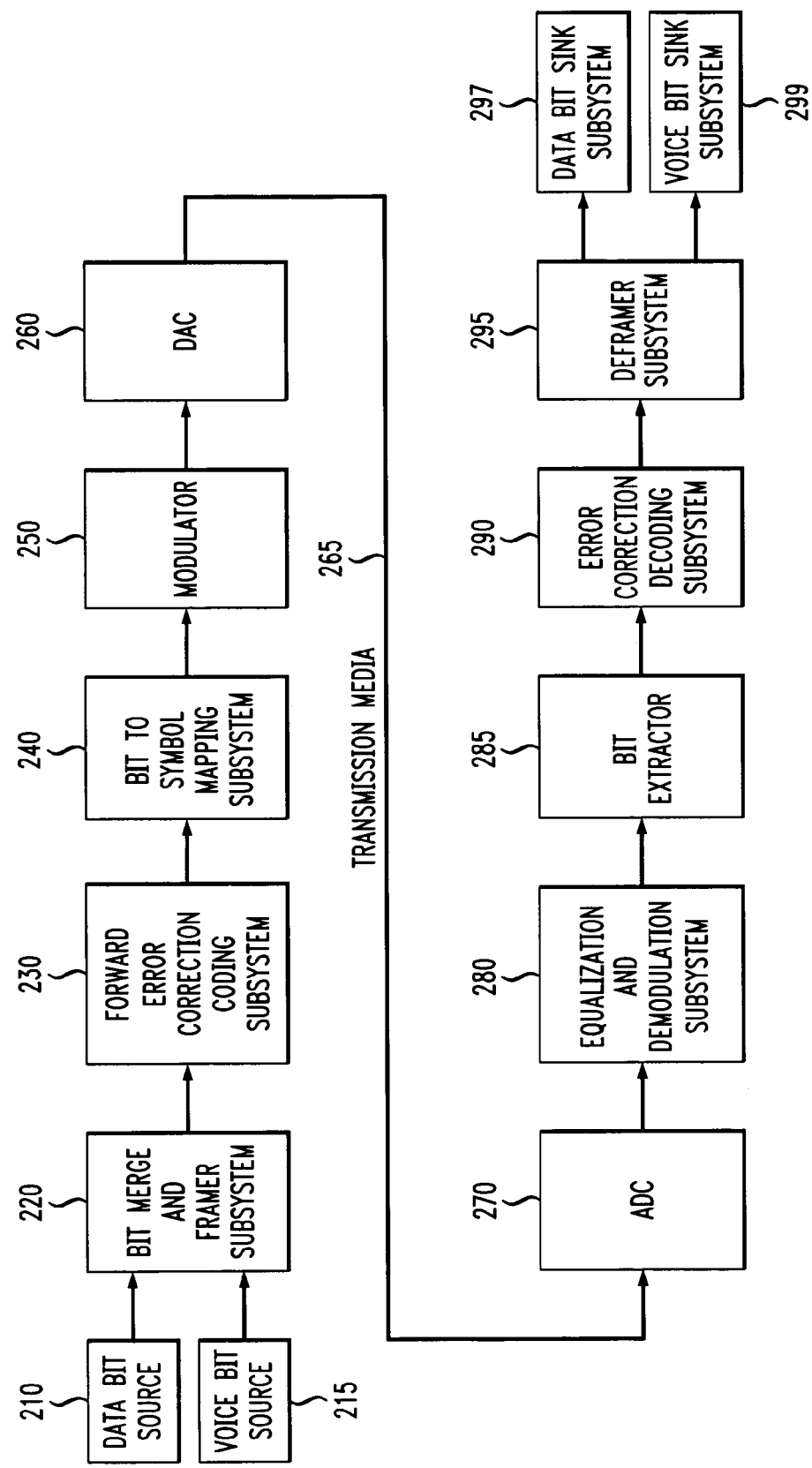
FIG. 2 illustrates a block diagram of an embodiment of a transmitter and receiver constructed according to the principles of the present invention.

Turning now to FIG. 2, illustrated is a block diagram of an embodiment of a transmitter and receiver constructed according to the principles of the present invention. The transmitter and receiver may be associated with a communications system such as the central office 120 or remote terminal hub 130 of the telecommunications network 100 illustrated and described with respect to FIG. 1.

Data signals (via a data bit source 210) and voice signals (via a voice bit source 215) enter the transmitter and are merged together in bit merge and framer subsystem 220. For instance, the merging may be accomplished by the interleaving of frames or sub-frames of voice and data signals on the basis of a time slice. Appropriate header information indicating the type of merged signal (i.e., voice or data) may also be included with the merged information. The merged bits are then processed by a forward error correction coding subsystem 230 using conventional forward error correction coding algorithms, which are then passed on to a bit-to-symbol mapping subsystem 240. The bit-to-symbol mapping subsystem 240 deciphers between disparate types of signals (i.e., voice and data signals) and separates the signals accordingly. In conjunction therewith, the bit-to-symbol mapping subsystem 240 maps the signals into symbols as a function of transmission requirements associated with the different types of signals.

A modulator 250 of the transmitter modulates the symbols using, for instance, Fast Fourier Transform operations in association with a modulation technique such as QAM as is understood by those skilled in the art. Thereafter, a digital-to-analog converter 260 converts the digital representations into analog signals for transmission through a communications channel (s) of a transmission medium 265 (analogous to the twisted pair wire 125 illustrated and described with respect to the telecommunications network 100 of FIG. 1). The digital-to-analog converter 260 also performs other assorted analog processing functions.

At the receiving end (e.g., the remote terminal hub 130 of the telecommunications network 100 illustrated and described with respect to FIG. 1) of the transmission medium 265, an analog-to-digital converter 270 of a receiver performs various functions upon the analog signals, such as filtering, and then converts the signals into a digital format. The digital signals are then subjected to an equalization and demodulation subsystem 280, which perform data conditioning tasks and extraction tasks. The equalization operation substantially compensates for signal deterioration associated with the imperfections in the transmission of the signals across the telecommunications network. The equalization and demodulation subsystem 280 also digitally demodulates the conditioned data. The demodulation operation generally occurs to extract information from a carrier signal or signals associated with the transfer of the information across the transmission medium 265.

In the illustrated embodiment, information associated with the transmitted symbols is extracted from Discrete Multi-Tone (DMT), or multiple QAM carrier signals, and the information associated with the symbols is then processed by a bit extractor 285. The bit extractor 285 uses the symbol's constellation (determined by the type of modulation and the number of bits loaded) as a basis for interpreting the values that the symbol represents. The symbol constellation of the transmitted information (i.e., the symbols) may be determined through such means as synchronized time slicing through application of the bit extractor 285, or other methods of synchronization as devised by those skilled in the art.

The extracted bits are then input into an error correction decoding subsystem 290. The error correction decoding then commences, using assorted error correction coding algorithms. The decoded bits are then input into a deframer subsystem 295, which takes the decoded bits and after performing various forms of manipulation, sends the data signals to a data bit sink subsystem 297 and the voice signals to a voice bit sink subsystem 299. The data and voice bit sink subsystems 297, 299 then provide an interface to terminal devices such as the computer terminals 150 and voice terminals 140, respectively, of the telecommunications network 100 illustrated and described with respect to FIG. 1.

It should be understood that the representative transmitter and receiver are submitted for illustrative purposes only and other configurations (including a design that incorporates the transmitter and receiver sections into an integrated device) compatible with the principles of the present invention may be employed as the application dictates.

Figure 3:
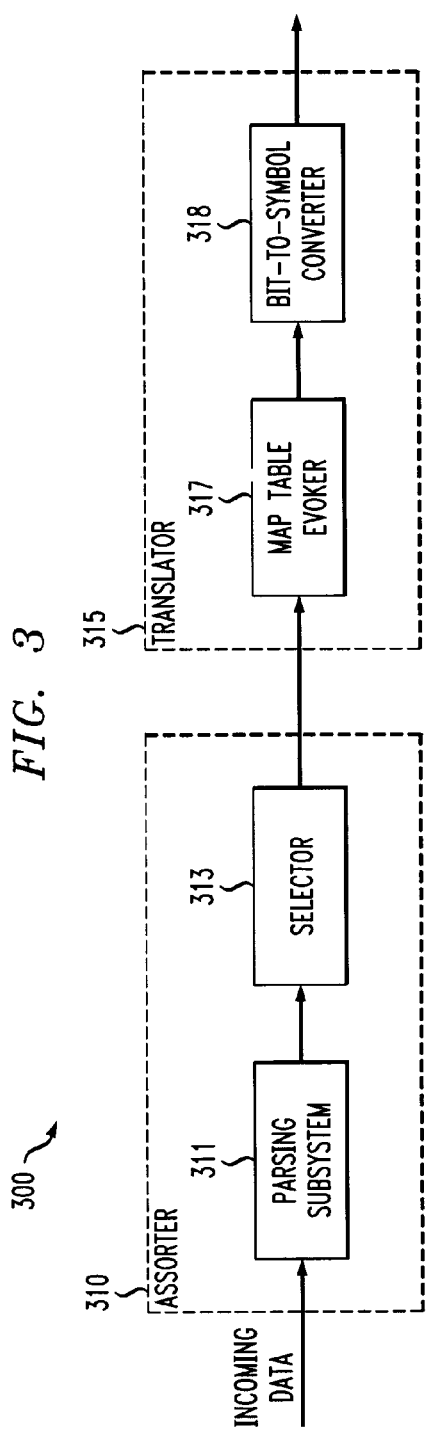
FIG. 3 illustrates a block diagram of an embodiment of a channel optimization system constructed according to the principles of the present invention.

Turning now to FIG. 3, illustrated is a block diagram of an embodiment of channel optimization system 300 constructed according to the principles of the present invention. The channel optimization system 300 may be embodied in portions of a transmitter (e.g., the bit-to-symbol mapping subsystem 240 illustrated and described with respect to FIG. 2) and a receiver (e.g., the bit extractor 285 illustrated and described with respect to FIG. 2).

The channel optimization system 300 includes an assorter 310 that receives and separates signals (e.g., first and second signals such as voice and data signals) and a translator 315. The received signals are parsed according to certain criterions by, for instance, checking timing or information embodied in a merged signal header associated with information entering the assorter 310. More specifically, the parsing subsystem 311 checks the timing boundary of the input signal or extracts control information to determine bits to be selected corresponding to the appropriate constellation density (e.g., voice signals or data signals) of the merged signals. A bit selector 313 of the assorter 310 then uses a value of the output of the parsing subsystem 311 to select and extract the appropriate number of bits, corresponding to a constellation point, in the merged stream. The extracted bits are then input from the assorter 310 into the translator 315. The translator 315 then transforms, or "maps", the associated data and voice bits received from the assorter 310 into corresponding symbols.

Figure 4:
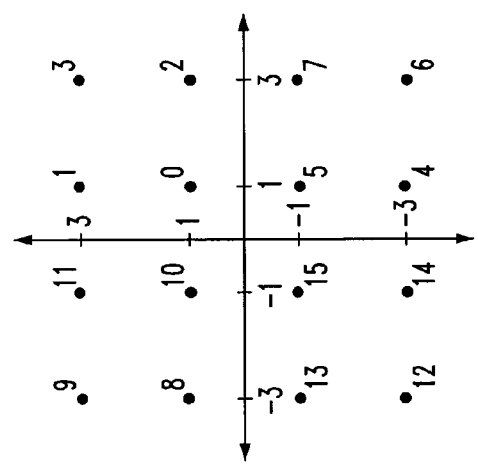
FIG. 4 illustrates a two dimensional vector symbol constellation diagram of an embodiment of a bit-to-symbol map constructed in accordance with the principles of the present invention.

The translator 315 includes a map table evoker 317 and a dynamic table of bit-to-symbol converter 318. The number of bits for either the voice or the data signals are determined by SNR calculation during initialization (see FIG. 5 and the related described below). The map table evoker 317 determines an evoke for the bit-to-symbol converter 318. The dynamic table of bit-to-symbol converter 318 then selects this appropriate table and performs a bit value to symbol conversion. The bit value to symbol conversion is generally performed in accordance with a symbol density conversion table as set forth below and illustrated in FIG. 4.

TABLE 2

| Input bits | Equivalent integer | Output Symbol |
|---|---|---|
| 0000 | 0 | (1, 1) |
| 0001 | 1 | (1, 3) |

TABLE 2-continued

| Input bits | Equivalent integer | Output Symbol |
|---|---|---|
| 0010 | 2 | (3, 1) |
| 0011 | 3 | (3, 3) |
| 0100 | 4 | (1, −3) |
| 0101 | 5 | (1, −1) |
| 0110 | 6 | (3, −3) |
| 0111 | 7 | (3, −1) |
| 1000 | 8 | (−3, 1) |
| 1001 | 9 | (−3, 3) |
| 1010 | 10 | (−1, 1) |
| 1011 | 11 | (−1, 3) |
| 1100 | 12 | (−3, −3) |
| 1101 | 13 | (−3, −1) |
| 1110 | 14 | (−1, −3) |
| 1111 | 15 | (−1, −1) |

The above table is an example of a bit-to-symbol mapping/conversion table for 4 bits with a corresponding constellation. The output symbols can also be represented as complex numbers such as 1+j1, −3−j3, etc. Please note that the equivalent integer values denoted in the middle column do not need to be stored. It is listed to demonstrate the correspondence from the table to the constellation points. Tables for other numbers of bits, from a certain minimum to "Nmax", may also be used in accordance with the principles of the present invention. "Nmax" may be generally defined as a maximum number of bits per symbol that may be supported for transmission by a telecommunications network (e.g., for a DSL-based system, the value may be 8–15).

The mapping may be accomplished by using appropriate implementations of a modulation technique (such as DMT, QAM or the Carrierless AM/PM System known as "CAP", a variation of QAM) as a function of the SNR or SNR gap characteristics of a communications channel or subchannel, and the BER associated with the information traversing the communications channel as described above.

Typically, the signals that can accommodate a higher BER (e.g., $10^{-3}$) are directed to a high symbol density conversion table and the signals necessitating a lower BER (e.g., $10^{-7}$) are directed to a low symbol density conversion table. For instance, the voice data most probably will be directed to the high symbol density conversion table and the data signals will be directed to the low symbol density conversion table. By mapping the signals in accordance with their transmission requirements, more information can be inserted on a communications channel to more efficiently utilize the bandwidth thereof.

In connection with a channel optimization system, a plurality of sub-channels of a transmission medium may be used to enhance bandwidth utilization for telecommunications network employing a DMT signaling system. The different sub-channels accommodating differing symbol densities will be more clearly illustrated with respect to an example described with reference to FIGS. 6A, 6B and 6C below.

For the case of the DMT-based system, which enables the use of sub-channels of a transmission medium substantially through the use of carrier or signal frequency selectivity, each sub-channel generally employs a distinct carrier frequency. Therefore, each sub-carrier will also have its own distinct carrier frequency which affects the channel capacity of the sub-channel. Each separate carrier frequency for a given sub-channel and its associated information is substantially processed according to the requirements of a certain application, but the signal output of each sub-channel is ultimately aggregated. The combined signal is then received by a receiver, for instance, a remote terminal hub (such as the remote terminal hub 130 of the telecommunications network 100 illustrated and described in respect to FIG. 1.) The remote terminal hub then frequency de-multiplexes the signal based on, for instance, Fourier transforms and then processes each separate sub-channel's carrier wave and associated information substantially in accordance with the receiver.

Turning now to FIG. 5A, illustrated is a flow diagram of an embodiment of an initialization of a channel optimization system (e.g., DMT channel optimization system) in accordance with the principles of the present invention. For the purpose of illustration, an example of signal throughput employing DMT, using separate sub-channels for voice and data signals, will hereinafter be described. One group of sub-channels (designated lower SNR sub-channels) will accommodate voice signals, requiring a higher BER of $10^{-3}$, and the remaining group of sub-channels (designated higher SNR sub-channels) will accommodate data signals, which require a lower BER of $10^{-7}$.

Once initialization has started at a step 501, all of the tones should be reordered according to their SNR, from the lowest SNR to the highest SNR, according to a step 503. In conjunction therewith, the sub-channels with similar measured SNR values will be loaded according to a lowest designated index number. An appropriate symbol mapping table with the maximum symbol density allowable for each tone is then stored in a memory of the DMT channel optimization system, according to a step 505, perhaps in a manner analogous to the map table evoker 317 illustrated and described with respect to FIG. 3. This is the end of the initialization of the DMT channel optimization system, according to a step 507.

Turning now to FIG. 5B, illustrated is a flow diagram of an operation of an embodiment of a channel optimization system (e.g., a DMT channel optimization system) in accordance with the principles of the present invention. Once operation of the DMT channel optimization system has started at a step 510, a data frame is received by the DMT channel optimization system, according to a step 515. The receipt of a data frame by the DMT channel optimization system may be analogous to the operation described with respect to the assorter 310 of the channel optimization system 300 of FIG. 3, which receives and separates signals for the translator 315 of the channel optimization system 300 of FIG. 3. The DMT channel optimization system separates the voice signal bits from the data signal bits, according to a step 520. The DMT channel optimization system then seizes an unloaded tone with the lowest SNR from the tones that are still remaining, according to a step 525.

The DMT channel optimization system then determines if there are any unloaded voice signal bits left from the data frame, according to a step 530. If there are any voice signal bits left, the number of bits per symbol should then be calculated using the voice signal's lower "SNR gap", according to a step 540. Again, each tone is assigned a final mapping table, perhaps in a manner analogous to the map table evoker 317 associated with FIG. 3. However, the symbol density for the voice signal should be a value that does not exceed the maximum value allowable for symbol density, which was stored in the step 505 associated with the initialization process described in accordance with FIG. 5A. Afterwards, the appropriate number of bits is actually loaded to a symbol of that tone, according to a step 550. This loading is perhaps analogous to functions of the bit selector 313 and the bit-to-symbol converter 318 associated with FIG. 3.

From the step 550, the step of loading the actual bits to the given tone as described above, the DMT channel optimization system again seizes an unloaded tone with the lowest SNR from the tones that are still remaining, according to the step 525. The DMT channel optimization system again determines if there are any unloaded voice signal bits left from the received data frame, according to the step 530. If there are any unloaded voice signal bits remaining from the received data frame, the DMT channel optimization system simply repeats the step 540 and its associated processes, as detailed above.

However, if the DMT channel optimization system determines in the step 530 that there are no unloaded voice signal bits, then the DMT channel optimization system continues instead to a step 560. In the step 560, the DMT channel optimization system then determines if there are any unloaded data signal bits remaining from the received data frame. If there are no unloaded data signal bits, then the loading of the DMT channel optimization system terminates according to a step 590.

If there are any unloaded data signal bits left to load to a tone, the number of bits per symbol should then be calculated by the DMT channel optimization system using the data signal's higher "SNR gap", according to a step 570. In other words, each tone is assigned a final mapping table, perhaps in a manner analogous to the map table evoker 317 associated with FIG. 3. Again, this symbol density for the data signal may be a value that does not exceed the maximum symbol density value, which was stored in the step 505 associated with the initialization process described in accordance with FIG. 5A. Then the appropriate number of bits is actually loaded to a symbol of that tone, according to a step 580. Again, this loading is perhaps analogous to functions of the bit selector 313 and the bit-to-symbol converter 318 associated with FIG. 3.

Afterwards, the DMT channel optimization system again seizes an unloaded tone with the lowest SNR from among the tones that are left, according to the step 525. The DMT channel optimization system once again determines if there are any unloaded voice signal bits left from the data frame, according to the step 530.

In connection with the signal processing, the transmitting and receiving ends are concurrently synchronized to share relevant information pertaining to voice and data signal separation. Those skilled in the art understand that other methods to separate the voice and data signals and synchronize the endpoints are well within the broad scope of the present invention.

Also for the purposes of illustration, an example is hereinafter described in the environment of a multi-channel/sub-channel telecommunications network using a signaling system, such as DMT. The utilization of the bandwidth of the telecommunications network is improved when voice and data signals of differing BER requirements are separated, and then directed to specific sub-channels with different SNRs.

For a DSL G.Lite (G.992.2) based system (see ITU-T. G.992.2 "Splitterless Asymmetric Digital Subscriber Line Transceivers", June 1999, which is incorporated herein by reference), the downstream transmission is considered. It is assumed that the signal is transmitted via the loop model of T1.601 number 2, (see ANSI T1.601-1998, "Integrated Services Digital Network Basic Access Interface for Use on Metallic Loops for Application on the Network Side of the NT," layer 1 specification, which is incorporated herein by reference). The interference is 24 self Near End Crosstalk (NEXT) noise and 24 self Far End Crosstalk (FEXT) noise (providing 24 adjacent loops with same service in the same bundle group). It is also assumed that the margin equals the CodingGain at about 6 db.

If voice and data signals are not separated and are all merely loaded to the sub-channels 33–128 (see FIG. 6A) based on a uniform SNR gap of 9.77 db (for a BER of $10^{-7}$), 169 bits can be transmitted. With a symbol rate of 4000 symbols/second, the bit rate is 676,000 bits-per-second. If 256,000 bits-per-second are needed to transmit the voice signals, the bandwidth available for data signals is 420,000 bits-per-second.

If the voice signals, however, are separated from the data signals, the voice sub-channel's constellation and symbol density (the modulation technique of QAM is being used for each sub-carrier) is calculated with a SNR gap of 5.56 db. Through the use of loading in accordance with the principles of the present invention, instead of designing for a 9.77 db SNR gap (under uniform treatment of voice and data signals), the sub-channel capacity for the voice signals has increased. Using the above values and substituting them into the various equations given earlier, the remaining channel bandwidth left for the data signals will be about 548,1000 bits-per-second, leading to an increased utilization of the bandwidth. This is 128,000 bits-per-second more signal throughput than the 420,000 bits-per-second bandwidth that was available previously.

Figure 6A:
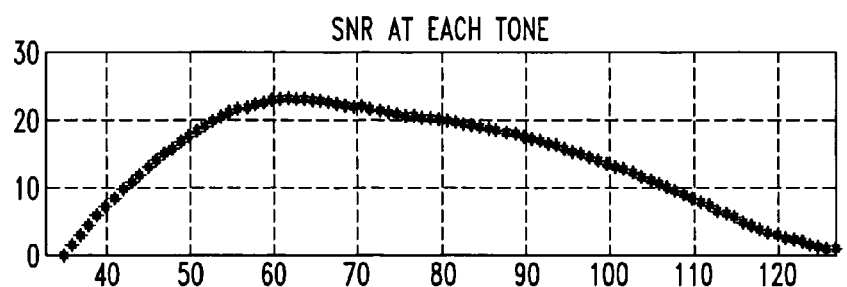
FIGS. 6A, 6B and 6C illustrate graphical representations demonstrating selected advantages in accordance with the principles of the present invention.
Figure 6B:
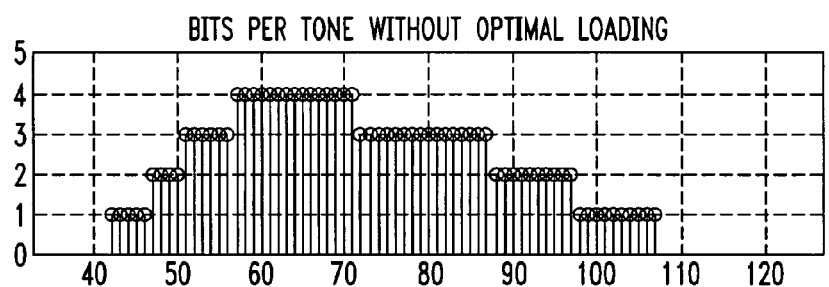
Figure 6C:
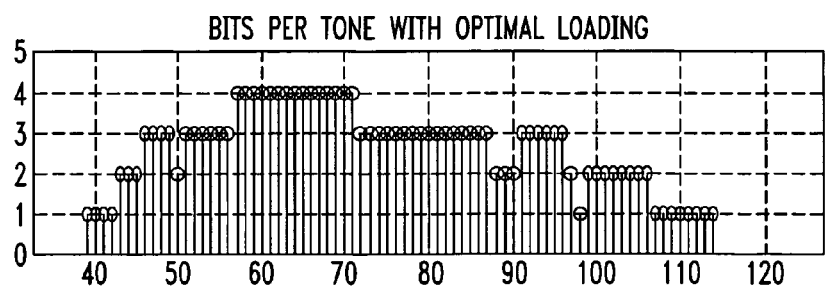

Turning now to FIGS. 6A, 6B and 6C, illustrated are graphical representations demonstrating selected advantages in accordance with the principles of the present invention. FIG. 6A illustrates the measured SNR (in db) of each of a selection of sub-channels, namely, sub-channel number 33 to sub-channel number 128. FIG. 6B shows the results of bits-per-sub-channel throughput with a conventional SNR gap loading. FIG. 6C shows the results of an advantageous embodiment of loading in accordance with the principles of the present invention with voice and data signals separated. In FIG. 6C, the diamond terminated sub-channels are loaded with the voice signals, while the circular terminated sub-channels are loaded with data signals.

It can be observed by comparing FIG. 6B, illustrating conventional techniques, and FIG. 6C, illustrating the principles of the present invention, that the sub-channels with a low SNR at the far ends are simply wasted by the conventional loading method. In this particular example, the system of the present invention loaded 10 bits to previously unused sub-channels, or 40,000 bits-per-second for the voice signals. It is also observed from FIG. 6C that usually one more bit can be added to each sub-channel if the voice signals are loaded instead of the data signals, also leading to increased utilization of the bandwidth of the telecommunications network.

It should be understood, that the embodiments of the channel optimization system constructed according to the principles of the present invention illustrated and described with respect to the preceding FIGUREs are submitted for illustrative purposes only and other configurations compatible with the principles of the present invention may be employed as the application dictates. Also, it should be understood that the systems and subsystems associated with the present invention may be embodied in software, dedicated or hardwired discrete or integrated circuitry, or combinations thereof.

Finally, for a better understanding of digital communications, in general, "Digital Communications," by Edward A.

Lee and David G. Messerschmitt, Kluwer Academic Publishers (1994) and "Digital Communications," by John Proakis, McGraw-Hill, 3rd Edition (1995) and in reference to Digital Subscriber Line Services including the standards and systems that support the technology, see "Understanding Digital Subscriber Line Technology," by Thomas Starr, Peter Silverman, and John M. Coiffi, Prentice Hall (1998), each of which is incorporated herein by reference.

Although the present invention has been described in detail, those skilled in the art should understand that they can make various changes, substitutions and alterations herein without departing from the spirit and scope of the invention in its broadest form.

What is claimed is:

1. A channel optimization system for use with a communications channel, comprising:
    an assorter configured to receive first and second signals having disparate transmission characteristics, said assorter including a parsing subsystem configured to extract control information associated with said first and second signals and a selector, coupled to said Parsing subsystem, configured to select one of said first and second signals in accordance with said control information; and
    a translator, coupled to said assorter, configured to encode said selected one of said first and second signals into a symbol representation as a function of a transmission characteristic associated therewith.

2. The channel optimization system as recited in claim 1 wherein said translator, comprises:
    a map table evoker configured to determine a conversion table to employ with said selected one of said first and second signals; and
    a converter, coupled to said map table evoker, configured to encode said one of said first and second signals into said symbol representation.

3. The channel optimization system as recited in claim 1 wherein said first signal is a voice signal and said second signal is a data signal.

4. The channel optimization system as recited in claim 1 wherein said channel optimization system is embodied in at least one of a transmitter and a receiver associated with a telecommunications network associated with said communications channel.

5. The channel optimization system as recited in claim 1 wherein said channel optimization system is at least partially embodied in a sequence of operating instructions operable on a processor.

6. The channel optimization system as recited in claim 1 wherein said communications channel has a frequency dependent channel capacity and said first and second signals have different bit error rate transmission characteristics, said translator configured to encode said selected one of said first and second signals into said symbol representation as a function of said bit error rate transmission characteristics and said channel capacity.

7. A method for use with a communications channel, comprising:
    receiving first and second signals having disparate transmission characteristics;
    extracting control information associated with said first and second signals;
    selecting one of said first and second signals in accordance with said control information; and
    encoding said selected one of said first and second signals into a symbol representation as a function of a transmission characteristic associated therewith.

8. The method as recited in claim 7 wherein said encoding further comprises determining a conversion table to employ when encoding said selected one of said first and second signals.

9. The method as recited in claim 7 wherein said first signal is a voice signal and said second signal is a data signal.

10. The method as recited in claim 7 wherein said method is performed in at least one of a transmitter and a receiver associated with a telecommunications network associated with said communications channel.

11. The method as recited in claim 7 wherein said method is at least partially embodied in a sequence of operating instructions operable on a processor.

12. The method as recited in claim 7 wherein said communications channel has a frequency dependent channel capacity and said first and second signals have different bit error rate transmission characteristics, said encoding said selected one of said first and second signals into said symbol representation being a function of said bit error rate transmission characteristics and said channel capacity.

13. A channel optimization system for use with a communications channel, comprising:
    an assorter means that receives first and second signals having disparate transmission characteristics, said assorter means including a parsing subsystem means that extracts control information associated with said first and second signals and a selector means, coupled to said parsing subsystem means, that selects one of said first and second signals in accordance with said control information; and
    a translator means, coupled to said assorter means, that encodes said selected one of said first and second signals into a symbol representation as a function of a transmission characteristic associated therewith.

14. The channel optimization system as recited in claim 13 wherein said translator means, comprises:
    a map table evoker means that determines a conversion table to employ with said selected one of said first and second signals; and
    a converter means, coupled to said map table evoker means, that encodes said one of said first and second signals into said symbol representation.

15. The channel optimization system as recited in claim 13 wherein said first signal is a voice signal and said second signal is a data signal.

16. The channel optimization system as recited in claim 13 wherein said channel optimization system is embodied in at least one of a transmitter and a receiver associated with a telecommunications network associated with said communications channel.

17. The channel optimization system as recited in claim 13 wherein said channel optimization system is at least partially embodied in a sequence of operating instructions operable on a processor.

18. The channel optimization system as recited in claim 13 wherein said communications channel has a frequency dependent channel capacity and said first and second signals have different bit error rate transmission characteristics, said translator means encoding said selected one of said first and second signals into said symbol representation as a function of said bit error rate transmission characteristics and said channel capacity.

19. A transmitter for use with a communications channel of a telecommunications network that transmits first and second signals having disparate transmission characteristics, comprising:

a bit merge and framer subsystem that merges said first and second signals into a bit stream;

a bit-to-symbol mapping subsystem, coupled to said bit merge and framer subsystem, including:

an assorter that receives first and second signals, said assorter including a parsing subsystem that extracts control information associated with said first and second signals and a selector, coupled to said parsing subsystem, that selects one of said first and second signals in accordance with said control information, and a translator, coupled to said assorter, that encodes said selected one of said first and second signals into a symbol representation as a function of a transmission characteristic associated therewith; and a modulator, coupled to said bit-to-symbol mapping subsystem, that modulates said symbol representation for insertion on to said communications channel.

20. The transmitter as recited in claim 19 wherein said translator, comprises: a map table evoker that determines a conversion table to employ with said selected one of said first and second signals; and a converter, coupled to said map table evoker, that encodes said one of said first and second signals into said symbol representation.

21. The transmitter as recited in claim 19 wherein said first signal is a voice signal and said second signal is a data signal.

22. The transmitter as recited in claim 19 wherein said channel optimization system is embodied in at least one of a transmitter and a receiver associated with said telecommunications network.

23. The transmitter as recited in claim 19 wherein said channel optimization system is at least partially embodied in a sequence of operating instructions operable on a processor.

24. The transmitter as recited in claim 19 wherein said communications channel has a frequency dependent channel capacity and said first and second signals have different bit error rate transmission characteristics, said translator encoding said selected one of said first and second signals into said symbol representation as a function of said bit error rate transmission characteristics and said channel capacity.

25. A channel optimization system for use with a communications channel, comprising:

an assorter configured to receive first and second signals having disparate transmission characteristics and select one of said first and second signals; and a translator, coupled to said assorter, including a map table evoker configured to determine a conversion table to employ with said selected one of said first and second signals and a converter, coupled to said map table evoker, configured to encode said one of said first and second signals into a symbol representation as a function of a transmission characteristic associated therewith.

26. The channel optimization system as recited in claim 25 wherein said first signal is a voice signal and said second signal is a data signal.

27. The channel optimization system as recited in claim 25 wherein said channel optimization system is embodied in at least one of a transmitter and a receiver associated with a telecommunications network associated with said communications channel.

28. The channel optimization system as recited in claim 25 wherein said channel optimization system is at least partially embodied in a sequence of operating instructions operable on a processor.

29. The channel optimization system as recited in claim 25 wherein said communications channel has a frequency dependent channel capacity and said first and second signals have different bit error rate transmission characteristics, said translator configured to encode said selected one of said first and second signals into said symbol representation as a function of said bit error rate transmission characteristics and said channel capacity.

30. A channel optimization system for use with a communications channel, comprising:

an assorter means that receives first and second signals having disparate transmission characteristics and selects one of said first and second signals; and a translator means, coupled to said assorter means, including a map table evoker means that determines a conversion table to employ with said selected one of said first and second signals and a converter means, coupled to said map table evoker means, that encodes said selected one of said first and second signals into a symbol representation as a function of a transmission characteristic associated therewith.

31. The channel optimization system as recited in claim 30 wherein said first signal is a voice signal and said second signal is a data signal.

32. The channel optimization system as recited in claim 30 wherein said channel optimization system is embodied in at least one of a transmitter and a receiver associated with a telecommunications network associated with said communications channel.

33. The channel optimization system as recited in claim 30 wherein said channel optimization system is at least partially embodied in a sequence of operating instructions operable on a processor.

34. The channel optimization system as recited in claim 30 wherein said communications channel has a frequency dependent channel capacity and said first and second signals have different bit error rate transmission characteristics, said translator means encoding said selected one of said first and second signals into said symbol representation as a function of said bit error rate transmission characteristics and said channel capacity.

35. A transmitter for use with a communications channel of a telecommunications network that transmits first and second signals having disparate transmission characteristics, comprising:

a bit merge and framer subsystem that merges said first and second signals into a bit stream;

a bit-to-symbol mapping subsystem, coupled to said bit merge and framer subsystem, including:

an assorter that receives first and second signals and selects one of said first and second signals, and a translator, coupled to said assorter, including a map table evoker that determines a conversion table to employ with said selected one of said first and second signals and a converter, coupled to said map table evoker, that encodes said one of said first and second signals into a symbol representation as a function of a transmission characteristic associated therewith; and a modulator, coupled to said bit-to-symbol mapping subsystem, that modulates said symbol representation for insertion on to said communications channel.

36. The transmitter as recited in claim 35 wherein said first signal is a voice signal and said second signal is a data signal.

37. The transmitter as recited in claim 35 wherein said channel optimization system is embodied in at least one of a transmitter and a receiver associated with said telecommunications network.

38. The transmitter as recited in claim 35 wherein said channel optimization system is at least partially embodied in a sequence of operating instructions operable on a processor.

39. The transmitter as recited in claim 35 wherein said communications channel has a frequency dependent channel capacity and said first and second signals have different bit error rate transmission characteristics, said translator encoding said selected one of said first and second signals into said symbol representation as a function of said bit error rate transmission characteristics and said channel capacity.

* * * * *